United States Patent Office 3,313,641
Patented Apr. 11, 1967

3,313,641
DISPERSIONS AND PROCESS THEREFOR
Peter Jochen Borchert, Elkhart, Ind., assignor to Miles Laboratories, Inc., Elkhart, Ind., a corporation of Indiana
No Drawing. Filed Nov. 18, 1963, Ser. No. 324,203
7 Claims. (Cl. 106—213)

This invention relates to a process for producing a stable dispersion of dialdehyde polysaccharides in water. More particularly, it relates to the process of reacting hydrogen peroxides with a water slurry of dialdehyde polysaccharides and to the novel stable dispersions prepared thereby.

Dialdehyde polysaccharides, such as dialdehyde corn starch, are well known in the art and are known to be useful for increasing the wet strength of paper, for example. However, the water solubility and water dispersibility of dialdehyde polysaccharides are quite low and complicated procedures are necessary in order to get sufficient dialdehyde polysaccharide into dispersion so that the paper or paper pulp can be treated with it. This is especially true when the dispersions are to be prepared in high concentrations containing as much as 20–30 weight percent solids. Prior art dispersions of dialdehyde polysaccharides were limited in utility since they became unstable as the polymer chain began to degrade when stored a week or longer at room temperature.

It is an object of the present invention to provide a process for preparing high solids content dispersions of dialdehyde polysaccharides in water.

It is another object of the present invention to provide water dispersions of dialdehyde polysaccharides that have high solids content and have improved resistance to degradation upon standing over a prolonged period of time.

According to the present invention, a dialdehyde polysaccharide-water slurry containing up to about 30 weight percent dialdehyde polysaccharide and substantially free of metal ions is reacted with from about 0.5 to 2.0 weight percent hydrogen peroxide (based on weight of dialdehyde polysaccharide) at a reaction temperature of from about 75° C. to about 95° C. Preferably the hydrogen peroxide is employed in amounts from about 1 to about 2 weight percent, based on weight of dialdehyde polysaccharide. The reaction is continued for a period of from about 30 to 60 minutes and then the resulting dispersion is cooled to room temperature. This stable dispersion containing from about 10 to about 30 weight percent dialdehyde polysaccharide can be used immediately or it can be stored at room temperature for several months without change in appearance, viscosity or loss in effectiveness as a wet strength agent for paper. The hydrogen peroxide oxidizes some of the aldehyde groups of the dialdehyde polysaccharide to carboxy groups. This improves the dispersibility. The dispersion thus contains a carboxylated dialdehydepolysaccharide.

The dialdehyde polysaccharides useful as starting materials in the present process of preparing stable dispersions are frequently referred so as periodate oxidized polysaccharides. This is due to their preparation by the well-known oxidation of polysaccharides with periodic acid. This preparation can be illustrated by the conversion of starch to dialdehyde starch or periodate oxidzed starch using periodic acid in accordance with the following equation:

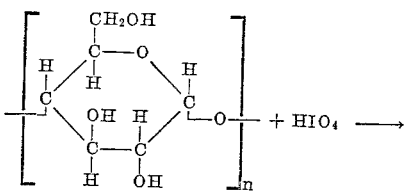 $+ HIO_4 \longrightarrow$

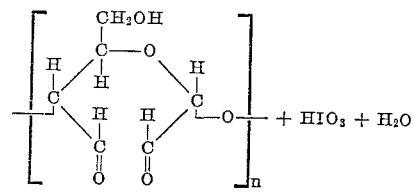 $+ HIO_3 + H_2O$ wherein $n$ stands for the number of repeating structural units in the molecule, which may range from as few as about 20 to as many as several thousand. The preparation of dialdehyde starch is more particularly described in U.S. Patents 2,648,629 of W. Dvonch et al. and 2,713,553 of C. L. Mehltretter.

The dialdehyde polysaccharides useful in preparing dispersions of the present invention may be the dialdehyde derivative of any polysaccharide, such as corn, wheat, rice, tapioca or potato starches, amyloses, amylopectins, celluloses, gums, dextrans, algins, inulins and the like. Of these polysaccharides, the dialdehyde derivatives known generically as dialdehyde starch are the best known and most widely used. However, where it is desired to have dispersions of dialdehyde derivatives of other polysaccharides, these may be used as well. The dialdehyde polysaccharides useful in the present invention can contain from about 0.5 to about 100 mole percent dialdehyde saccharide units. In general, it is preferred to use dialdehyde polysaccharides which are about 90 percent to 100 percent oxidized; i.e., those wherein about 90 to 100 of each 100 of the original anhydroglucose units have been converted to dialdehyde units such as by periodate oxidation as above described.

The water used in the preparation of the stable dispersions of the present invention should be substantially free of metal ions. Such ions can cause hydrolysis and degradation of the dialdehyde polysaccharides. Distilled water or deionized water can be used in the present invention.

The hydrogen peroxide useful in the present invention is used in the form of commercially available aqueous solutions containing, for example, from about 30 to about 50 weight percent hydrogen peroxide.

The overall temperature range useful in the preparation of stable water dispersions of dialdehyde polysaccharides is from about 75° C. to about 95° C. Within this range, the particular temperature is generally dependent upon the dialdehyde polysaccharide concentration in the slurry and the concentration of the hydrogen peroxide supplied for oxidation of some of the aldehyde groups of the dialdehyde polysaccharide. Higher temperatures are required as the dialdehyde polysaccharide concentration in the slurry increases. There is thus a substantially direct relationship between dialdehyde polysaccharide concentration and reaction temperature. On the other hand, the temperature required tends to decrease as the hydrogen peroxide concentration increases. There is thus a substantially inverse relationship between hydrogen peroxide concentration and reaction temperature.

In carrying out the process of the present invention, the dialdehyde polysaccharide, in the presence of hydrogen peroxide, reaches a stage of maximum swelling of the dialdehyde polysaccharide granules at 75–95° C. within about 5–15 minutes. With moderate stirring at this temperature a gradual rupture of the swollen granules occurs and homogeneous dispersions are formed within a period of from about 30 to about 60 minutes of total heating time, depending on temperature, concentration of dialdehyde polysaccharide and total amount hydrogen peroxide used.

The novel dispersions of the present invention comprise the reaction product of a substantially metal ion-free water slurry of dialdehyde polysaccharide and hydrogen peroxide wherein such reaction was carried out at about 75–95° C. for about 30–60 minutes. These dispersions are quite stable and can be used in a well-known manner to impart wet strength improvements to paper.

When the novel dispersions of the present invention are used for paper treatment they are preferably used in combination with a cationizing agent or retention aid to assist in coupling the dialdehyde polysaccharide to the paper fibers. These cationizing agents or retention aids are the well-known cationic starches, polymeric amines and polyamides. The cationizing agent can be added first to a slurry of paper pulp followed by addition of the dialdehyde polysaccharide dispersion or the cationizing agent and the dialdehyde polysaccharide dispersion can be mixed together and this mixture applied to the paper pulp slurry. Water soluble compounds of zirconium, such as zirconium oxychloride, can also be used as cationizing agents.

The following examples serve to illustrate, but not to limit, the practice of the invention.

*Example 1*

To an open beaker, equipped with stirrer and thermometer, and placed in a steam bath, were charged 500 ml. of distilled water and 150 g. of dialdehyde corn starch wherein 96 percent of the anhydroglucose units of the corn starch were oxidized to dialdehyde saccharide units. The mixture was stirred until the dialdehyde starch was completely wetted, and then the resulting slurry was heated to 90–92° C. Six (6) grams of 50 weight percent aqueous hydrogen peroxide were added (2 weight percent hydrogen peroxide based on weight of dialdehyde starch) and the reaction mixture was maintained at 90–92° C. with moderate stirring for a total of 30 minutes. After 10 minutes of heating the slurry formed a thick paste. With continued heating the paste viscosity diminished and a translucent dispersion was formed after about 30 minutes of heating. The resulting dispersion was cooled to room temperature and stored in a glass jar at room temperature for three months. During this storage period there were no signs of instability, polymer degradation or viscosity change.

*Example 2*

The dispersion prepared in Example 1 above was tested as a wet strength agent for paper immediately after formation and after the three month storage period. An aliquot part of the dispersion was mixed with 20 weight percent zirconium oxychloride cationizing agent based on anhydrous weight of the dialdehyde starch contained in the dispersion. After diluting the mixture with distilled water to a concentration of 1 weight percent solids, the cationic dispersion was added to a bleached kraft pulp slurry having a Canadian Standard Freeness of 450 cc. The cationic dispersion was used in an amount of 1 weight percent dialdehyde starch based on dry weight of the pulp. After a mixing and contacting time of 1–3 minutes, the pulp mixture was used to make handsheets in a well-known manner employing a Noble and Wood Handsheet Machine. These sheets were dried for 2 minutes at 200° F. (93.3° C.). Similar handsheets were prepared from the same paper pulp slurry but which had not been treated with the cationic dispersion. The treated and untreated handsheets were soaked in room temperature distilled water for 5 minutes and the tensile strengths were measured by standard techniques. The handsheets prepared from pulp that had been treated with the novel dialdehyde polysaccharide dispersion of the present invention had an average wet tensile strength of 7.4 lbs./in. of width. Paper prepared from untreated pulp had average wet tensile strength of only 1.6 lbs./in. of width. After a storage time of 3 months, an aliquot part of the Example 1 dispersion was cationized with zirconium oxychloride and added to paper pulp in the same manner as described above using same concentrations of dispersion, cationizing agent and pulp. Handsheets prepared from this treated pulp had average wet tensile strength of 7.0 lbs./in. of width. This clearly shows the improved stability over prolonged storage periods of the novel dispersions of the present invention prepared by a novel process.

*Example 3*

Various dispersions of dialdehyde polysaccharides in substantially metal ion-free water were prepared employing different concentrations of dialdehyde polysaccharides and different amounts of hydrogen peroxide. The general preparation procedure is the same as described in Example 1 above. These dispersions were then mixed with 20 weight percent zirconium oxychloride or 30 weight percent of a dicyandiamide-formaldehyde condensation product based on dry weight of the dialdehyde polysaccharide, and the cationized dispersions were employed to prepare handsheets. The wet tensile strengths of these handsheets were measured by well-known techniques. Each of the dispersions was tested for effectiveness as a wet strength agent in paper after 24 hours and after 4 weeks. Two of the dispersions were also allowed to stand for 22 weeks. The dialdehyde polysaccharide used as raw material was the same as described in Example 1. For comparison purposes, the wet tensile strengths were measured for handsheets employing as the wet strength agents prior art dispersions of dialdehyde polysaccharides in water. These prior art dispersions employed, respectively, 5 and 10 weight percent solids and were prepared in water having total alkalinity of 100 p.p.m. and 200 p.p.m., respectively. The "total alkalinity" of water is well-known to be expressed in terms of parts per million of equivalent calcium carbonate. Alkalinity is measured by the procedure set forth in "TAPPI Standards and Suggested Methods" T-620M55, page 4.

The results are shown in the following table.

| Dispersion, weight percent solids | Weight percent, $H_2O_2$ employed | Heating conditions | | Wet tensile strength, lbs./in. width, 40 lb. basis weights | | |
|---|---|---|---|---|---|---|
| | | Temp.,° C. | Time, min. | Within 24 hrs. | After 4 weeks | After 22 weeks |
| 10 | 1 | 82–86 | 45 | 7.7 | 8.4 | |
| 15 | 1 | 85–90 | 40 | 8.7 | 8.4 | |
| 20 | 2 | 87–92 | 30 | 7.9 | 6.4 | [1] 7.1 [2] 7.4 |
| 25 | 2 | 90–92 | 35 | 7.2 | 7.1 | |
| 30 | 2 | 90–92 | 45 | 8.6 | 7.6 | [1] 7.4 [2] 7.6 |
| Prior art 5 | | 85–90 | 35 | 7.9 | 8.0 | |
| Prior art 10 | | 90–92 | 45 | 5.4 | 3.1 | |

[1] Zirconium oxychloride cationizer.
[2] Dicyandiamide-formaldehyde condensation product as cationizer.

It can be seen from the above table that the novel dispersions of the present invention provide high wet tensile strengths at high solids levels and such effectiveness is retained over relatively long periods of time. The prior art dispersions on the other hand are limited to relatively lower solids content and the effectiveness after storage is substantially reduced.

What is claimed is:

1. A process for preparing stable dispersions of dialdehyde polysaccharides in water which comprises forming a slurry of dialdehyde polysaccharide in substantially metal ion-free water, said slurry containing up to about 30 weight percent solids, contacting said slurry with from about 0.5 to about 2.0 weight percent hydrogen peroxide based on weight of dialdehyde polysaccharide, said contact taking place at a reaction temperature of from about 75° C. to about 95° C. for a period of from about 30 to about 60 minutes, and then cooling the resulting dispersion to room temperature.

2. A process for preparing stable dispersions of dialdehyde polysaccharides in water which comprises forming a slurry of dialdehyde polysaccharide in substantially metal ion-free water, said slurry containing from about 10 to about 30 weight percent solids, contacting said slurry with from about 1 to about 2 weight percent hydrogen peroxide based on weight of dialdehyde polysaccharide, said contact taking place at a reaction temperature of from about 75° C. to about 95° C. for a period of from about 30 to about 60 minutes, and then cooling the resulting dispersion to room temperature.

3. A process as claimed in claim 1 wherein the dialdehyde polysaccharide contains from about 0.5 to about 100 mole percent dialdehyde saccharide units.

4. A process as claimed in claim 1 wherein the dialdehyde polysaccharide contains from about 90 to about 100 mole percent dialdehyde saccharide units.

5. A process as claimed in claim 2 wherein the dialdehyde polysaccharide contains from about 0.5 to about 100 mole percent dialdehyde saccharide units.

6. A process as claimed in claim 2 wherein the dialdehyde polysaccharide contains from about 90 to about 100 mole percent dialdehyde saccharide units.

7. A stable dispersion of carboxylated dialdehyde polysaccharide in water which comprises the room temperature cooled product resulting from the reaction of a substantially metal ion-free water slurry of dialdehyde polysaccharide containing up to 30 weight percent solids with from about 0.5 to about 2.0 weight percent hydrogen peroxide based on weight of dialdehyde polysaccharide, wherein such reaction was carried out at about 75°–95° C. for about 30–60 minutes.

References Cited by the Examiner
UNITED STATES PATENTS

| | | | |
|---|---|---|---|
| 2,669,523 | 2/1954 | Kerr et al. | 106—213 |
| 2,894,945 | 7/1959 | Hofreiter et al. | |
| 3,081,199 | 3/1963 | Taylor | 106—213 |

ALEXANDER H. BRODMERKEL, *Primary Examiner.*

L. B. HAYES, *Assistant Examiner.*